(12) United States Patent
Casado et al.

(10) Patent No.: US 9,075,904 B2
(45) Date of Patent: Jul. 7, 2015

(54) VULNERABILITY ESTIMATION FOR CACHE MEMORY

(71) Applicant: Intel Corporation, Santa Clara, CA (US)

(72) Inventors: Javier Carretero Casado, Barcelona (ES); Xavier Vera, Barcelona (ES); Tanausu Ramirez, Barcelona (ES); Daniel Sanchez, L'Hospitalet de Llobregat (ES); Enric Herrero Abellanas, Cardedeu (ES); Nicholas Axelos, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 13/976,285

(22) PCT Filed: Mar. 13, 2013

(86) PCT No.: PCT/US2013/031038
§ 371 (c)(1),
(2) Date: Jun. 26, 2013

(87) PCT Pub. No.: WO2014/142852
PCT Pub. Date: Sep. 18, 2014

(65) Prior Publication Data
US 2014/0281740 A1 Sep. 18, 2014

(51) Int. Cl.
*G06F 11/34* (2006.01)
(52) U.S. Cl.
CPC .................. *G06F 11/3409* (2013.01)
(58) Field of Classification Search
CPC . G06F 11/1064; G06F 11/073; G06F 11/076;
G06F 11/0772; G06F 11/3409; G06F 12/0802;
G06F 12/126; G06F 12/0804; G06F 11/0793;
G06F 11/1008; G06F 11/1405; G06F 11/1407;
G06F 12/0842; G06F 12/1027
See application file for complete search history.

(56) References Cited

U.S. PATENT DOCUMENTS 7,197,670 B2 * 3/2007 Boatright et al. ............... 714/42
7,447,054 B2 11/2008 Abella et al.
7,558,992 B2 * 7/2009 Ergin et al. .................... 714/701
(Continued)

FOREIGN PATENT DOCUMENTS

JP 2011-150684 A 8/2011

OTHER PUBLICATIONS

International Search Report and Written Opinion, International Patent No. PCT/US2013/031038, mailed Dec. 12, 2013, 9 pages.

*Primary Examiner* — Nadeem Iqbal
(74) *Attorney, Agent, or Firm* — Trop, Pruner & Hu, P.C.

(57) ABSTRACT

A method of determining vulnerability of a cache memory includes associating a first counter with a cache element and periodically incrementing the first counter. When a read or other access that consumes the data in the cache element occurs, a current value of the first counter is accumulated. When a write or other cache access that modifies data in the cache element occurs, the first counter is reset. At the end of an evaluation period, the value in a total counter approximates the number of clock cycles during which data that was consumed was vulnerable. Dividing this value by the number of clock cycles approximates the vulnerability of this cache element. The vulnerability for a subset of all cache elements may be measured and extrapolated to obtain an estimate for the vulnerability of the cache memory as a whole.

22 Claims, 6 Drawing Sheets

(56) References Cited

U.S. PATENT DOCUMENTS

| | | |
|---|---|---|
| 7,577,015 B2 | 8/2009 | Abella et al. |
| 7,590,913 B2 * | 9/2009 | Kurts et al. .................. 714/746 |
| 7,600,145 B2 | 10/2009 | Vera et al. |
| 7,689,804 B2 | 3/2010 | Vera et al. |
| 7,747,913 B2 | 6/2010 | Abella et al. |
| 8,069,376 B2 | 11/2011 | Monferrer et al. |
| 8,074,110 B2 | 12/2011 | Vera et al. |
| 8,090,996 B2 * | 1/2012 | Vera et al. .................. 714/47.2 |
| 8,103,830 B2 | 1/2012 | Wilkerson et al. |
| 8,151,094 B2 * | 4/2012 | Vera et al. .................. 712/220 |
| 8,407,653 B1 * | 3/2013 | Schumacher et al. ........ 716/132 |
| 2004/0107304 A1 | 6/2004 | Grun |
| 2004/0236860 A1 | 11/2004 | Logston et al. |
| 2005/0283590 A1 | 12/2005 | Weaver et al. |
| 2006/0101303 A1 | 5/2006 | Bower, III et al. |
| 2006/0156153 A1 | 7/2006 | Fossum et al. |
| 2006/0156155 A1 | 7/2006 | Gurumurthi et al. |
| 2007/0011513 A1 | 1/2007 | Biswas et al. |
| 2007/0162965 A1 | 7/2007 | Carter et al. |
| 2007/0165041 A1 * | 7/2007 | Kurts et al. .................. 345/553 |
| 2008/0022163 A1 | 1/2008 | Tanaka et al. |
| 2008/0155375 A1 | 6/2008 | Vera et al. |
| 2009/0031169 A1 | 1/2009 | Bower, III et al. |
| 2009/0113240 A1 | 4/2009 | Vera et al. |
| 2009/0150653 A1 | 6/2009 | Monferrer et al. |
| 2009/0271676 A1 | 10/2009 | Biswas et al. |
| 2010/0083203 A1 | 4/2010 | Bose et al. |
| 2011/0010720 A1 | 1/2011 | Smith et al. |
| 2011/0010770 A1 | 1/2011 | Smith et al. |
| 2011/0047408 A1 * | 2/2011 | Gille et al. .................. 714/6 |
| 2011/0063093 A1 | 3/2011 | Fung et al. |
| 2011/0066807 A1 | 3/2011 | Hay et al. |
| 2011/0153944 A1 | 6/2011 | Kursawe |
| 2012/0047398 A1 | 2/2012 | Vera et al. |
| 2012/0102334 A1 | 4/2012 | O'Loughlin et al. |
| 2012/0117312 A1 | 5/2012 | Chan et al. |
| 2012/0324141 A1 | 12/2012 | Seong et al. |
| 2013/0061104 A1 * | 3/2013 | Hartl .................. 714/741 |
| 2013/0096902 A1 * | 4/2013 | Bose et al. .................. 703/14 |

* cited by examiner

VULNERABILITY ESTIMATION FOR CACHE MEMORY

TECHNICAL FIELD

Embodiments described herein generally relate to microprocessor reliability and, in particular, to estimating the vulnerability of data stored in a cache memory.

BACKGROUND

Cache memories are employed to reduce latency associated with memory access operations. However, cache memories introduce coherency and reliability concerns when cached data is modified. Until saved back to system memory, cached data in a modified state is vulnerable to alpha particles, cosmic rays, and other sources of soft errors.

DESCRIPTION OF EMBODIMENTS

Figure 1:
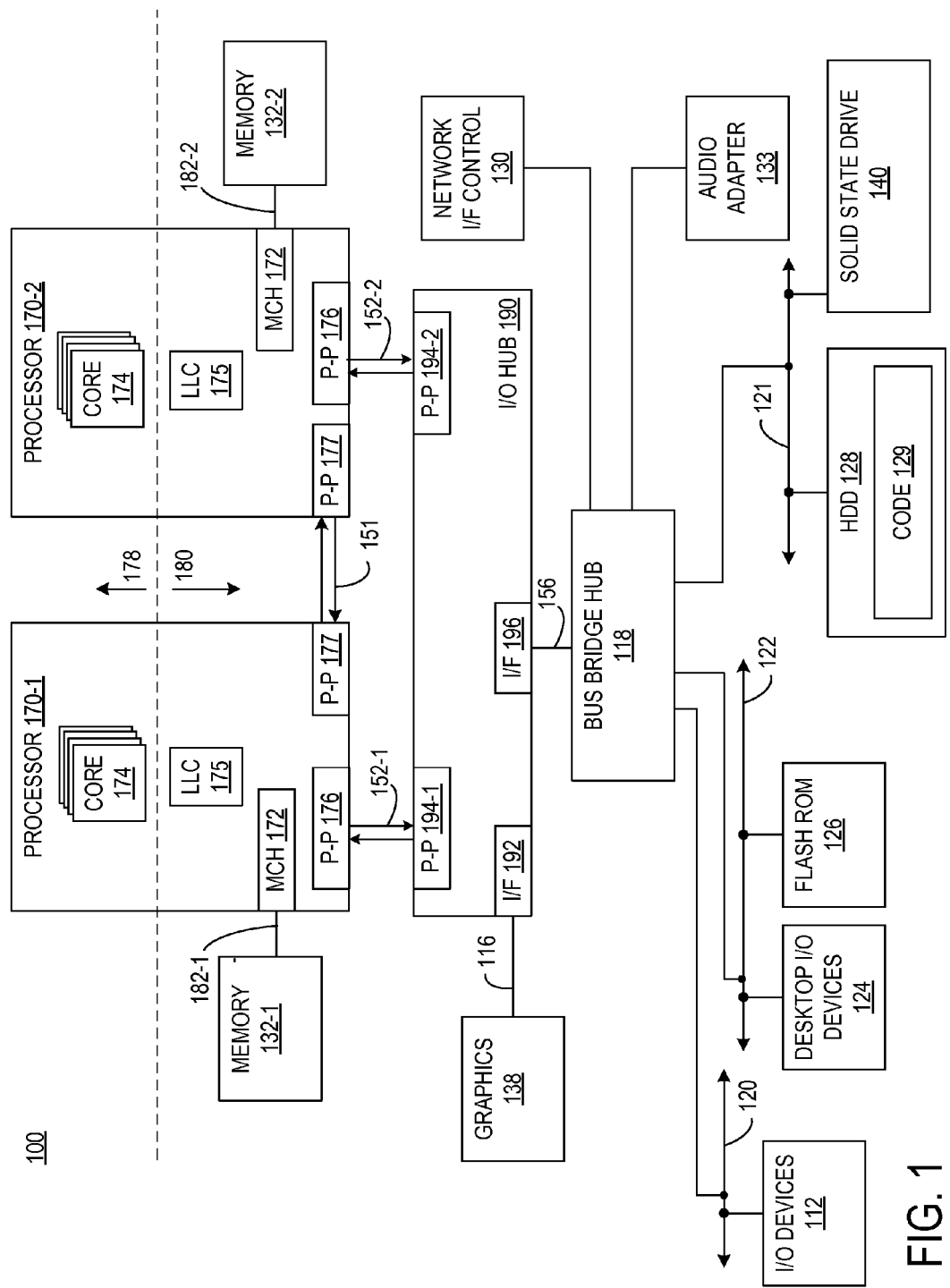
FIG. 1 illustrates a computer system used in conjunction with at least one embodiment.

Embodiments described herein pertain to the reliability of a processor core, which may be quantified as Failures in Time (FIT), e.g., the number of failures per $10^9$ hours of operation under worst-case conditions. Ensuring that a processor has an acceptable FIT value (also sometimes referred to as a FIT budget) may impose design and operational constraints on the core count, the core microarchitecture, performance (e.g., clock signal frequency), and power consumption (e.g., operating voltage). The FIT value of a hardware block may depend on an Architectural Vulnerability Factor (AVF), which indicates a percentage of bits holding vulnerable data or data that would be unrecoverable if lost.

In at least one embodiment, a method of determining a vulnerability value for a cache memory includes associating a counter with a cache element, initializing the counter (e.g., to 0), and periodically incrementing the counter. In at least one embodiment, the vulnerability value is indicative of a duration during which data stored in a cache element of the cache memory is vulnerable. In some embodiments, whenever an access to the cache element occurs and the access is a type of access that modifies the data, the counter value is reset. In addition, whenever an access to the cache element occurs and the access is a type of access that consumes the data, the counter value is accumulated to a counter value total after which the counter value is reset. In at least one embodiment, at the end of any interval during which the counter manipulation was performed, the final value of the total counter, when normalized with respect to the interval, provides an estimate of the probability that the cache element is vulnerable at a given instance by estimating the probability that the cache memory contains data that is modified or otherwise vulnerable. This ratio of the number of clock cycles or other windows of time during which data is vulnerable to the total number of clock cycles or windows of times may be referred to as the AVF and may be used as a parameter of interest with respect to soft error vulnerability.

The granularity of the cache element used for vulnerability determination is a function of the processor's functionality with regards to reading and writing the grain of interest. For example, if the processor in question permits the reading and writing of half lines, quarter lines, or even smaller grains of a cache line, the vulnerability can be determined at equivalent of grain levels. In fact, if the granularity used for vulnerability determination is less fine than the granularity of instructions executed by the processor, the vulnerability measure may become skewed by the difference in grain scope. In some embodiments, the vulnerability of a cache memory is estimated by evaluating the vulnerability of a relatively small number of cache lines or cache line sub sections and extrapolating that information to encompass the entire cache memory.

In at least one embodiment, estimating the vulnerability of a cache memory includes determining a number of cycles that have elapsed during an interval of test and dividing the cumulative vulnerability value at the end of the evaluation period. In at least one embodiment, the determination of a vulnerability of a cache memory may be used to modify an operational parameter of a processor based on a vulnerability value. In at least one of these embodiments, the operational parameter modified in response to a vulnerability value may include a parameter such as a voltage parameter, the current parameter, an impedance parameter, and a power management processor.

In one embodiment, estimating a vulnerability of a cache element includes monitoring the cache element for certain events, managing a counter associated with the cache element, and recording or accumulating a value of the counter when specific events occur. In at least one embodiment, vulnerability determination may include associating a counter with a cache element, initializing the counter, for example, to 0, and periodically incrementing the signal counter. In at least one embodiment, the counter may be incremented based upon transitions of a clock signal wherein the counter increments each clock cycle. In other embodiments, a counter may increment more slowly or more quickly than the clock cycle.

In some embodiments, a counter, as it increments periodically, may be accessed and accumulated or accessed and reset depending upon type of access. In some embodiments, a counter associated with a cache element is accumulated when a transaction that consumes the data is recorded. Examples of transactions that consume data include a read transaction and, in the case of a write-back cache, an eviction. Either of these transactions require the processor to use data that has been vulnerable for a relatively extended duration.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Embodiments may be implemented in many different system types. Referring now to FIG. 1, a block diagram of selected elements of a computer system 100 in accordance with an embodiment of the present disclosure is illustrated. FIG. 1 illustrates an embodiment of a system 100 in which processors, memory, and input/output devices are interconnected by a number of point-to-point (P-P) interfaces. However, in other embodiments (not shown in FIG. 1) processor system 100 may employ different bus architectures, such as a front side bus, a multi-drop bus, and/or another implementation. Although the illustrated embodiment of system 100 includes multiple processors 170 and each processor 170 includes multiple processing cores 174, other embodiments may include multiple single core processors, a single multi-core processor, or a single single-core processor.

The FIG. 1 embodiment of computer system 100, in which at least one embodiment of a cache controller that supports read/write cache partitions as described herein may be included, is illustrated. The FIG. 1 embodiment of system 100 is a multi-processor system that include a first processor 170-1 and a second processor 170-2. Although FIG. 1 illustrates two processors 170, other embodiments may include more or fewer processors. The FIG. 1 embodiment of processors 170 includes a core region 178 and an integration region 180. Core region 178 includes one or more processing cores 174 while the illustrated embodiment of integration region 180 includes a memory controller hub (MCH) 172, a last level cache (LLC) 175, a processor-hub point-to-point interface 176, and a processor-processor point-to-point interface 177.

Processing cores 174 may each include hardware and firmware resources (not depicted) to support an execution pipeline. These resources may include, as examples, a cache memory hierarchy, which may include a dedicated level one (L1) instruction cache, a dedicated L1 data cache, a level 2 (L2) data/instruction cache, or a combination thereof, prefetch logic and buffers, branch prediction logic, decode logic, a register file, various parallel execution resources including arithmetic logic units, floating point units, load/store units, address generation units, a data cache, and so forth.

In the FIG. 1 embodiment, MCH 172 supports bidirectional transfer of data between a processor 170 and a system memory 132 via a memory interconnect 182. System memory 132-1 may represent a bank of memory interfaces (or slots) that may be populated with corresponding memory devices, circuits, or boards. System memory 132 may be, as an example, a double-data rate (DDR) type dynamic random-access memory (DRAM) while memory interconnect 182 and MCH 172 may comply with a DDR interface specification.

In the multiprocessor embodiment of system 100 illustrated in FIG. 1, each processor 170 includes an MCH 172 to communicate with a portion of system memory 132 that is local to processor 170. For example, system memory 132-1 is local to processor 170-1 and represents a portion of the system memory 132 as a whole. In the FIG. 1 embodiment, system 100 is a distributed memory multiprocessor system in which each processor 170 can access each portion of system memory 132, whether local or not. While local accesses may have lower latency, accesses to non-local portions of system memory 132 are permitted.

In FIG. 1, each processor 170 also includes a point-to-point interface 177 that supports communication of information with a point-to-point interface 177 of one of the other processors 170 via an inter-processor point-to-point interconnection 151. In some embodiments, processor-hub point-to-point interconnection 152 and processor-processor point-to-point interconnections 151 comply with a common set of specifications or protocols. In other embodiments, point-to-point interconnection 152 may represent a different transport than point-to-point interconnection 151.

The FIG. 1 processors 170 include point-to-point interfaces 176 to communicate via point-to-point interconnect 152 with a point-to-point interface 194 of an I/O hub 190. In the FIG. 1 embodiment, I/O hub 190 includes a graphics interface 192 to support bidirectional communication of data with a graphics adapter 138 via a graphics interconnection 116, which may be implemented as a high speed serial bus, e.g., a peripheral components interface express (PCIe) bus or another suitable bus.

The FIG. 1 embodiment of I/O hub 190 also communicates, via an interface 196 and a corresponding interconnection 156, with a bus bridge hub 118 that supports various bus protocols for different types of I/O devices or peripheral devices. The FIG. 1 embodiment of bus bridge hub 118 supports, as examples, a network interface controller (NIC) 130 that implements a packet-switched network communication protocol (e.g., Gigabit Ethernet), a sound card or audio adapter 133, and a low bandwidth bus 122 (e.g., low pin count (LPC), I2C, Industry Standard Architecture (ISA)), to support legacy interfaces referred to herein as desktop I/O devices 124 that might include, as examples, interfaces for a keyboard, mouse, serial port, parallel port, and a removable media drive. The FIG. 1 embodiment of low bandwidth bus 122 further includes an interface for a nonvolatile memory (NVM) device such as flash read only memory (ROM) 126 that may store code for configuring a system following a reset or power transition, e.g., basic I/O system (BIOS) code.

A storage protocol bus 121 supported by bus bridge hub 118 may comply with any of various storage busses, e.g., a serial AT attachment (SATA) bus or a small computer system interface (SCSI) bus, to support persistent storage devices including conventional magnetic core hard disk drives (HDD) 128 to stored computer executable code 129, which may represent processor executable instructions including operating system instructions, application program instructions, and so forth, that, when executed by the processor, cause the processor to perform operations described herein. The FIG. 1 embodiment of system 100 also includes an "HDD-like" semiconductor-based storage resource referred to as solid state drive 140. The FIG. 1 embodiment of bus bridge hub 118 as shown further includes a general purpose serial communication bus 120, e.g., a universal serial bus (USB), to support a variety of serial I/O devices 112. Although specific instances of communication busses and bus targets have been illustrated and described, other embodiments may employ different communication busses and different target devices.

Figure 2:
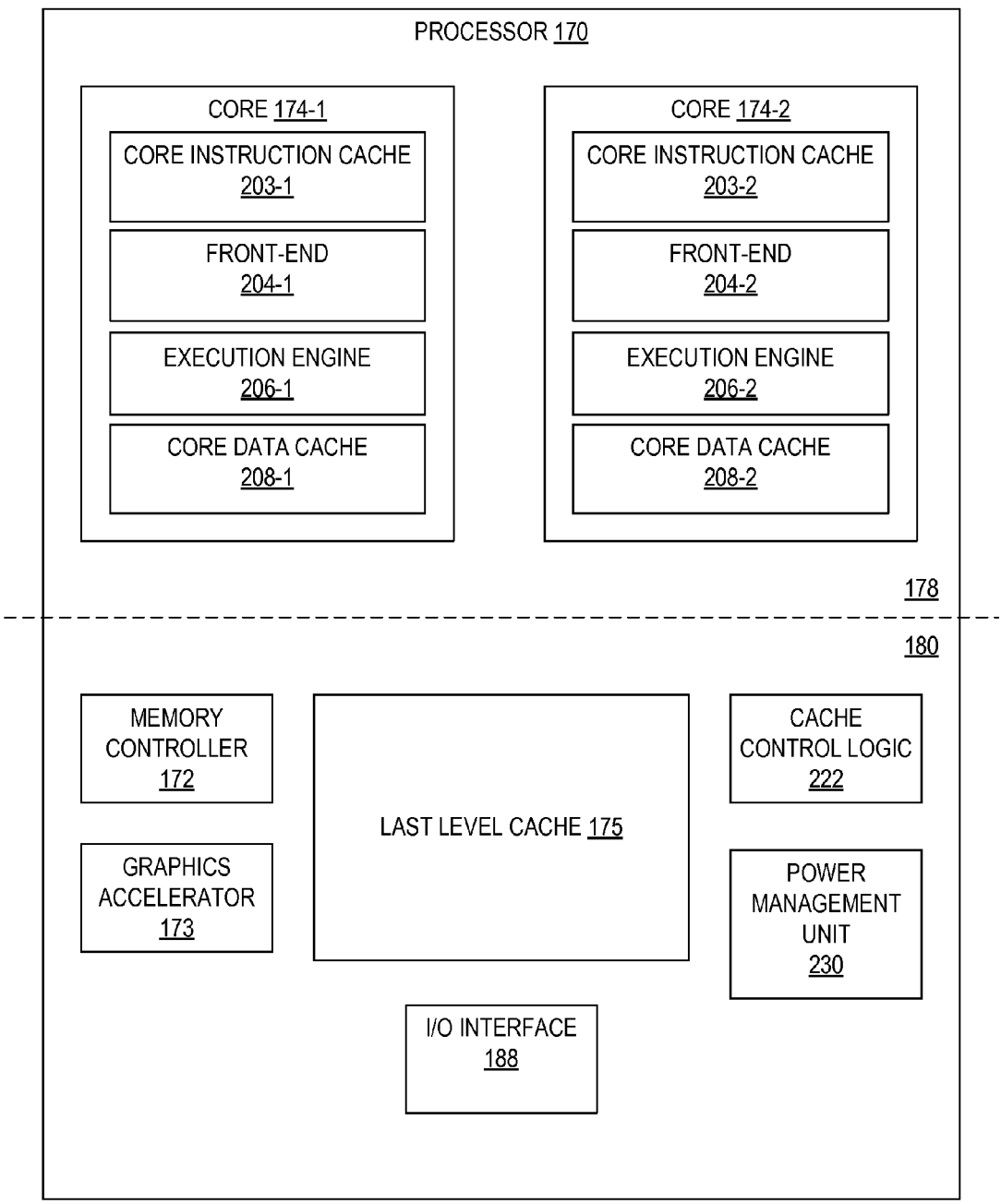
FIG. 2 illustrates a processor used in conjunction with at least one embodiment.

Referring now to FIG. 2, one embodiment of processor 170 is illustrated. The FIG. 2 embodiment of processor 170 includes a core region 178 and an integration region 180. Core region 178 shown in FIG. 2 includes processing cores 174-1 and 174-2. Other embodiments of processor 170 may include more or fewer processing cores 174.

The FIG. 2 embodiment of processing cores 174 include a core instruction cache 203, a front end 204, an execution engine 206, and a core data cache 208. Front end 204 monitors an instruction pointer and, based on predictions regarding program flow, fetches or prefetches instructions from core instruction cache 208 and issues instructions to execution engine 206. Execution engine 206 includes multiple parallel pipelines including one or more floating point pipelines, one or more integer arithmetic logic unit pipelines, one or more branch pipelines, and one or more memory access pipelines, also referred to herein as load/store pipelines. Execution engine 206 decodes instructions, retrieves operands required to perform instructions, and may generate micro code to process the instructions from core instruction cache 203, may route the instructions through the appropriate execution pipeline, and may store any results. Execution engine 206 includes a register file that may support register renaming, speculative execution, and out-of-order execution of instructions.

The embodiment of integration region 180 illustrated in FIG. 2 includes a last level cache (LLC) 175 and cache control logic 222. In this embodiment, LLC 175 is a shared resource for all of processing cores 174 of processor 170. As suggested by its name, LLC 175 represents, from the perspective of processor 170, the last available hierarchical tier of cache memory. If a memory access instruction that is presented to LLC 175 generates a cache miss, the requested data must be retrieved from system memory 132.

Processing core 174 and/or integration region 180 may include one or more levels of a cache hierarchy between core caches 203, 208 and LLC 175. In at least one embodiment, for example, processing core 174 includes a cache memory intermediate between core caches 203, 208 and LLC 175. Although not shown in FIG. 2, processing core 174 may include, in some embodiments, an intermediate tier cache memory hierarchically located between core caches 203, 208 and LLC 175. Each of the cache memories of processing core 174 may have a unique architectural configuration. In at least one embodiment, core data cache 208 and LLC 175 are both multiple-way, set associative caches. In some embodiments, LLC 175 is inclusive with respect to core data cache 208 while, in other embodiments, LLC 175 may be non-inclusive with respect to core data cache 208.

Cache control logic 222 controls access to the cache memories, enforces a coherency policy, implements a replacement policy, and monitors memory access requests from external agents, e.g., other processors 170 or I/O devices. In at least one embodiment, LLC 175 and core caches 203, 208 comply with an MESI protocol or a modified MESI protocol. The four states of the MESI protocol are described in Table 1.

TABLE 1

Description of Cacheline States in the MESI Protocol

| MESI State | Description |
| --- | --- |
| MODIFIED | The cache line contains valid data that is modified from the system memory copy of the data. Also referred to as a 'dirty' line. |
| EXCLUSIVE | The line contains valid data that is the same as the system memory copy of the data. Also indicates that no other cache has a line allocated to this same system memory address. Also referred to as a 'clean' line. |
| SHARED | The line contains valid and clean data, but one or more other caches have a line allocated to this same system memory address. |
| INVALID | The line is not currently allocated and is available for storing a new entry. |

A modified MESI protocol could include, as an example, an additional state, the "F" state, identifying one of a plurality of "S" state lines, where the "F" state line is designated as the line to forward the applicable data should an additional request for the data be received, e.g., from a processor that does not have the data.

Integration region 180 of processor 170 as shown in FIG. 2 also includes power management unit 230 to control power provided to the various resources of processor 170. In some embodiments, for example, power management unit 230 provides unique power supply levels to core region 178 and integration region 180. In other embodiments, power management unit 230 may be further operable to provide unique power supply levels to each processing core 174 and/or provide clock signals at unique frequencies to processing cores 174. In addition, power management unit 230 may implement various power states for processor 170 and define events that produce power state transitions.

The integration region 180 illustrated in FIG. 2 includes graphics accelerator 173 to support low latency, high bandwidth communication with a display device (not depicted). The integration of graphics accelerator 173 into processor 170 represents an alternative to the embodiment illustrated in FIG. 1, in which communication with graphics adapter 138 is implemented in the I/O hub 190.

Integration region 180 as illustrated in FIG. 2 includes an I/O interface 188 to support communication with one or more chipset devices, discreet bus interfaces, and/or individual I/O devices. In some embodiments, I/O interface 188 provides one or more point-to-point interfaces such as the interfaces 176 and 177 illustrated in FIG. 1. In other embodiments, I/O interface 188 may provide an interface to a shared bus to which one or more other processors 170 may also connect.

Figure 3:
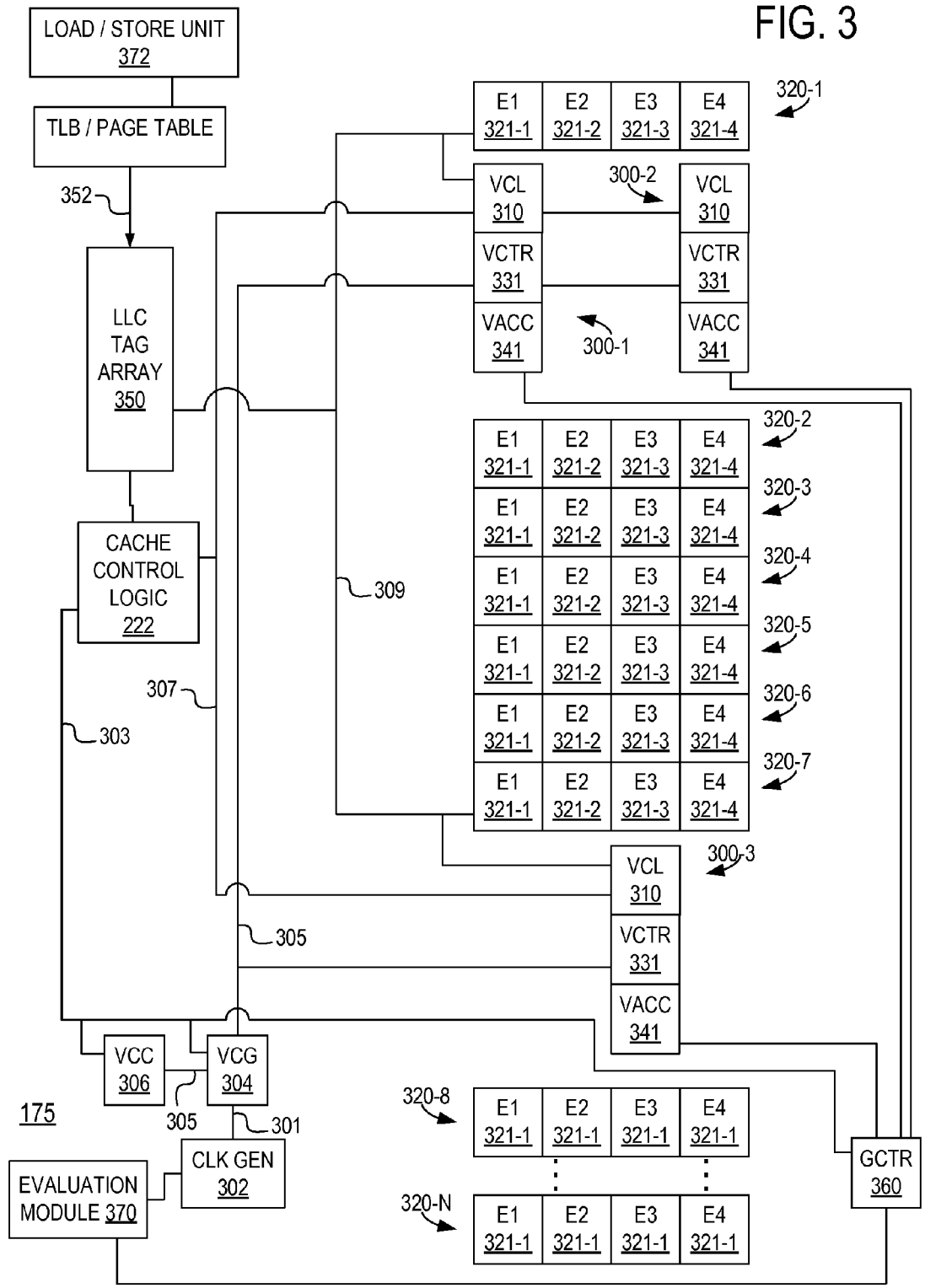
FIG. 3 illustrates a timing diagram of one embodiment of a vulnerability estimation method.

Referring now to FIG. 3, an embodiment of LLC 175 including instances of vulnerability logic 300 to estimate a soft error vulnerability of LLC 175 is illustrated. FIG. 3 illustrates an embodiment in which vulnerability logic 300 is associated with portions or segments of cache lines 320, referred to as cache elements 321, that may be individually modified or otherwise accessed by processor 170. In the FIG. 3 embodiment, each cache line 320 includes a group of four cache elements 321-1 through 321-4 and each cache element 321 represents one quarter of the corresponding cache line 320. If LLC 175 employs 64-byte cache lines, for example, each cache element 321 is a 16-byte segment with cache element 321-1 corresponding to bytes 0 to 15, cache element 321-2 including bytes 16-31, and so forth.

Although FIG. 3 illustrates vulnerability logic 300 as being implemented in LLC 175, vulnerability logic 300 may be associated with other cache memories of processor 170. Similarly, while the FIG. 3 embodiment illustrates vulnerability logic 300 implemented at the granularity of a cache element 321 that represents one quarter of a cache line, other embodiments may employ more or fewer cache elements 321 per cache line 320 and may implement vulnerability logic 300 on a granularity that differs from the granularity of cache elements 321. In addition, FIG. 3 illustrates an embodiment in which vulnerability logic 300 is associated with some, but not all, cache lines 320 and some, but not all, cache elements 321 within those cache lines 320. In these embodiments, vulnerability of LLC 175 is estimated based on a sample of cache elements 321. The FIG. 3 embodiment illustrates vulnerability logic 300 implemented on selected cache elements 321 of two cache lines 320, namely, cache line 320-1 and cache line 320-7, but embodiments may employ more or fewer instances of vulnerability logic 300 and may associate vulnerability logic 300 with cache elements 321 that differ from the cache elements 321 that include vulnerability logic 300 in FIG. 3.

In the FIG. 3 embodiment, each instance of vulnerability logic 300 includes a counter identified as a vulnerability counter (VCTR) 331, an accumulator identified as a vulnerability accumulator (VACC) 341, and control logic identified as vulnerability control logic (VCL) 310. In addition, the illustrated embodiment includes a global counter (GCTR) 360 to indicate a sum of all VACCs 341, clock generation logic identified as vulnerability clock generator (VCG) 304, and a clock counter identified as vulnerability clock counter (VCC) 306 to indicate the number of elapsed clock cycles during a vulnerability evaluation period.

As illustrated in FIG. 3, VCG 304 receives a system clock signal 301 from system clock generator 302 and cache control logic 222 provides vulnerability enable signal 303 to VCG 304. When cache control logic 222 enables vulnerability estimation, VCG 304 is enabled and system clock signal 301 is gated through VCG 304 to produce vulnerability clock signal 305, which is provided to instances of vulnerability logic 300 and to VCC 306.

The FIG. 3 embodiment illustrates cache control logic 222 providing enable/reset signal 307 to each VCL 310. When cache control logic 222 enables VCL 310 and VCG 304, vulnerability clock signal 305 is provided to each VCTR 331. VCTR 331 increments at the end of each clock cycle as indicated by either a low-to-high or high-to-low transition of vulnerability clock signal 305. As illustrated in FIG. 3, each VCL 310 receives a cache line selection signal 309, in parallel with receipt of the signal by cache line 321, from LLC tag array 350. LLC tag array 350 receives a physical memory address 352 from a translation lookaside buffer (TLB) or page table (collectively 354) associated with a memory access instruction issued by a load store unite 372 or a cache control operation performed by cache control logic 222. A memory access instruction includes any load/read or store/write instruction executed by execution engine 206 (see FIG. 2) while a cache control operation is issued by cache control logic 222 to perform an operation needed to maintain or update the cache memory. For example, cache control operations might include an eviction operation, an invalidation operation, or a line fill operation initiated when a cache miss occurs and it is necessary to replace an existing line in the cache with a new line.

In one embodiment, each VCL 310 is operable to instruct its VCTR 331 to perform one of two possible operations depending upon the type of instruction VCL 310 is processing. For purposes of vulnerability estimation as illustrated in the FIG. 3 embodiments, there are two types of instructions, namely, instructions that consume data and instructions that modify data. In at least one embodiment, VCL 310 instructs VCTRs 331 to accumulate their current values in response to an instruction that consumes data and to clear in response to an instruction that modifies data. VCTRs 331 receive vulnerability clock signal 305 during vulnerability estimation intervals. At least one embodiment of vulnerability logic 300 increments the VCTRs 331 at every clock cycle transition. In other embodiments, the counters may increment on multiples of clock signals, for example, every two, three, four cycles, and so forth.

In at least one embodiment, VCTRs 331 increment at clock cycle intervals and accumulate whenever an instruction or operation that consumes cache element data is executed. In addition, VCTRs 331 are reset or cleared whenever an instruction that modifies data is executed. By clearing a counter whenever an instruction modifying data is encountered and accumulating whenever an instruction that consumes data is encountered, and incrementing the counter every clock cycle, the value in any VCTR 331 approximates the number of clock cycles that modified data was vulnerable in the applicable cache element 321. Given this information and the number of clock cycles that transpired or elapsed during a vulnerability estimation window, and estimation of the overall vulnerability can be obtained. At the end of a vulnerability estimation window, each VACC 341 contains a value approximating the number of clock cycles that the corresponding cache element was vulnerable. From the sample of vulnerability data provided by even a modest number of the VCTRs 331, an estimate of the cache memory's overall vulnerability may be extrapolated. As an example, if 2 of 64 cache lines 320 are instrumented with vulnerability logic 300 and each vulnerability logic 300 is associated with the entire cache line, the number of vulnerable cycles indicated by the two VACCs 341 that would be associated with these two VCTRs 331 could be multiplied by 32 to obtain an estimate of how many vulnerable cache line-cycles occurred for the entire cache memory during an evaluation period. The value could then be normalized against the total number of cache line-cycles to estimate the vulnerability of the cache memory Returning to the concept of granularity suggested by the use of elements 321 that represent only a portion of a cache line 320, the granularity preferably matches the granularity of the processor's ability to address sub elements of its cache lines for purposes of vulnerability estimation. If the smallest portion of a cache line that a processor can manipulate independently is a quarter of a cache line, there is no need to obtain data at a finer granularity than a quarter cache line. On the other hand, if the cache line elements employed in a particular implementation of vulnerability logic 300 include counters that are more coarse than the smallest element addressable, the estimation may be skewed. For example, if a VCTR 331 encompasses one half of a cache line but separate instructions modifying different quarters of the cache line, both instructions may alter the counter whereas neither cache line element was twice modified.

In at least one embodiment, VCTRs 331 are aligned in granularity with the smallest portion of a cache line addressable by the processor. If a processor supports direct cache addressing and the direct cache addressing implementation enables the processor to address every bite of a cache line, it may be theoretically possible, but nevertheless impractical, to associate VCTRs with each bite of an entire cache memory or an entire line of cache memory. If implementing vulnerability logic at the smallest cache line grain recognized by a processor would require an impractical level of vulnerability logic, a compromise may be suitable in which the granularity of the VCTRs is fixed at a quarter of a cache line or at some other predetermined value.

The FIG. 3 embodiment includes an evaluation module 370, which may be implemented in hardware logic, software, or a combination therefor. In at least one embodiment, evaluation module 370 receives the global count, representing the total number of vulnerable cache element-cycles, from global counter 360 and the value of VCC 306. From this information and configuration information indicating how the VCTRs participated in the evaluation period and the cache line granularity of each VCTR, evaluation module 370 may identify vulnerability conditions exceeding threshold values and evaluation module 370 may generate signals or otherwise initiate action in response to detecting any such threshold warning. As an example, it may be desirable from a power consumption perspective to operate a cache memory at the lowest possible supply voltage. If data suggests, however, that cache memories are more susceptible to soft errors and other types of failures at low supply voltages, evaluation module 370 may periodically monitor the vulnerability and initiate an increase in supply voltage for the cache memory upon identifying a vulnerability value exceeding a predetermined threshold. The example of controlling supply voltage is but one example of a type of corrective action that may be taken to reduce the vulnerability exposure. Other embodiments may include control of other system parameters Referring now to FIG. 4, a timeline 400 illustrates the operation of at least one embodiment of vulnerability logic 300 (FIG. 3). As explained with respect to FIG. 3, each instance of vulnerability logic 300 is associated with a cache element 321. The process illustrated in FIG. 4 may be repeated in parallel for a plurality of instances of vulnerability logic 300 corresponding to a plurality of cache elements 321 and may be extrapolated to estimate vulnerability of LLC 175 in aggregate.

Figure 4:
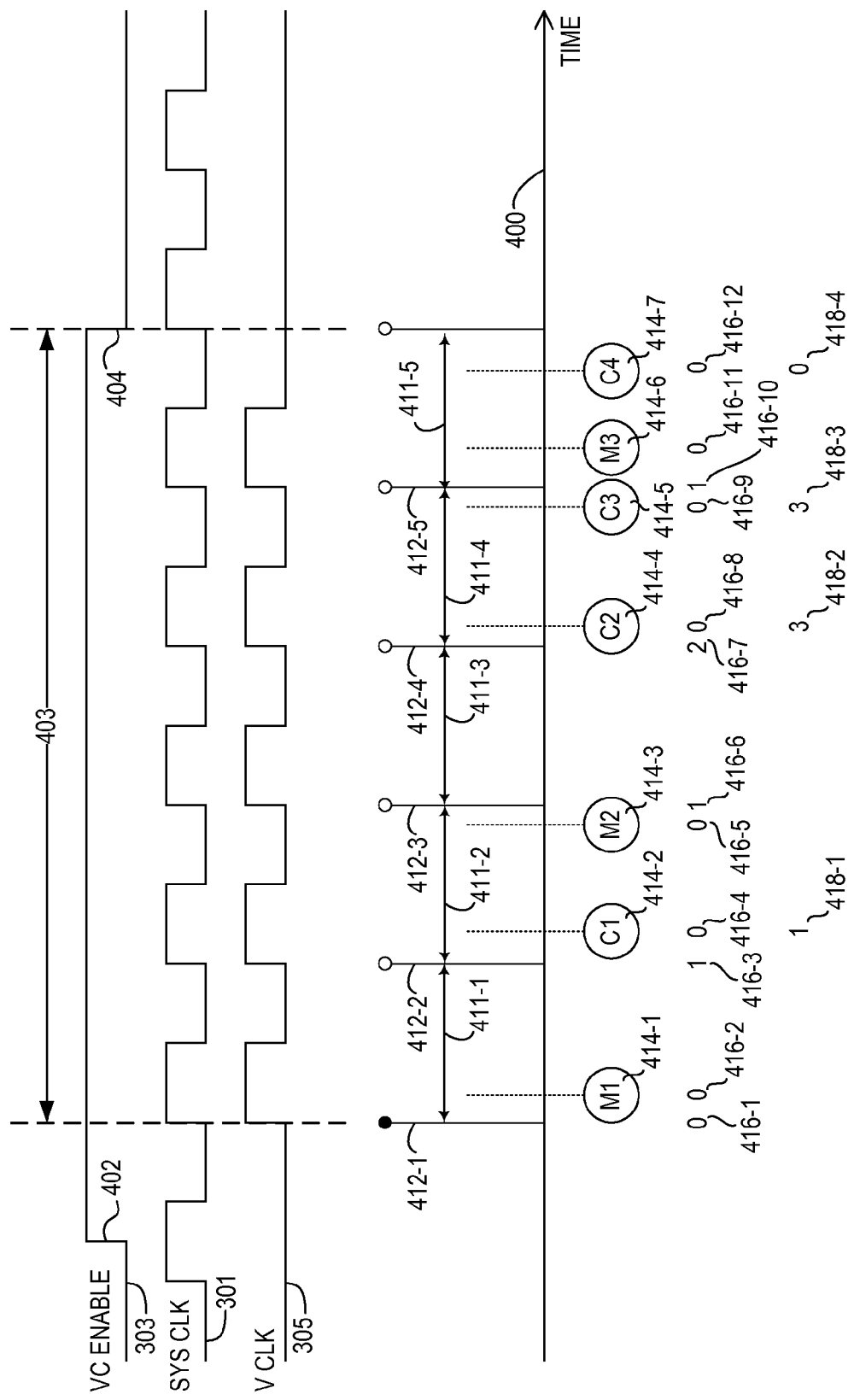
FIG. 4 illustrates one embodiment of vulnerability logic.

In the FIG. 4 embodiment, vulnerability clock signal 305 tracks system clock signal 301 when enabled by vulnerability clock enable signal 303 from cache control logic 222. In at least one embodiment, transition 402 of vulnerability clock enable signal 303 also triggers a reset of vulnerability logic counters including VCTRs 331, VACCs 341, GCTR 360, and VCC 306 (FIG. 3). In the illustrated example, transition 402 indicates a beginning of an vulnerability evaluation window 403 during which each instance of vulnerability logic 300 is active.

FIG. 4 illustrates clock cycles 411 defined by clock cycle transitions 412 of vulnerability clock signal 305 on timeline 400. FIG. 4 also illustrates access events 414, which represent events that access the cache element 321 (see FIG. 3) associated with the instance of vulnerability logic 300 (see FIG. 3) whose operation is illustrated in FIG. 4. In at least one embodiment, access events 414 may be associated with one of two categories, namely, accesses that consume data stored in a cache element and accesses that modify data stored in the cache element. With respect to accesses corresponding to memory instructions executed, for example, by execution engine 206, load instructions, sometimes referred to as read instructions, represent consuming accesses while store instructions, sometimes referred to as write instructions, represent modifying accesses.

With respect to accesses that occur when cache control logic 222 must perform a function to maintain compliance with a coherency policy or perform an update, replacement, fill, or eviction according to a replacement policy, the access category for purposes of vulnerability estimation as disclosed herein depends upon the type of event and on how the applicable cache memory handles modified data. In at least one embodiment, evicting a cache element is a consuming event in a write-back cache if the cache element is dirty, but is otherwise treated as a consuming modifying event for vulnerability estimation purposes.

FIG. 4 illustrates counter values 416 of VCTRs 331 (FIG. 3) and accumulator values 418 of VACC 341 (see FIG. 3) to illustrate the manner in which vulnerability logic 300 operates in response to the type and timing of the illustrated events. It is noted that counter values 416 and accumulator values 418 are shown directly below their corresponding events in time line 400.

The behavior of at least one embodiment of vulnerability logic 300 for cache events in a write-through cache is summarized in Table 2:

TABLE 2

Counter logic action for different cache events for a write-through cache.

| CACHE EVENT | COUNTER LOGIC ACTION |
|---|---|
| Load/Read | 1) Determine cache element being read.<br>2) Retrieve value stored in cache element's counter (VCTR).<br>3) Accumulate retrieved in cache element's accumulator (VACC).<br>4) Reset the counter to zero (0). |
| Store/Write | 1) Determine cache element being written.<br>2) Reset cache element's counter (VCTR) to zero (0). |
| Evict | 1) Determine cache element being evicted.<br>2) Reset cache element's counter (VCTR) to zero (0). |
| Fill | 1) Determine cache element being filled.<br>2) Reset cache element's counter (VCTR) to zero (0). |

In the example of vulnerability estimation illustrated in FIG. 4, actions for consuming and modifying cache events are illustrated for a cache memory that implements a write through policy. A write through policy commits modified data to backup storage, e.g., system memory or a higher level of cache memory, when the data is modified. A write-back policy defers the commitment of modified data until the line is evicted or requested by an external agent. In addition to the actions listed in Table 2, at least one embodiment of vulnerability logic 300 automatically increments VCTR 321 at each clock cycle transition 412. Together, the vulnerability logic describes results in a VCTR value that approximates the number of clock cycles during which data stored in the applicable cache element was vulnerable. Although discrepancies between the value of VCTR and the actual number of vulnerable clock cycles occur when, for example, the timing of a modifying event and a subsequent consuming event relative to the clock cycle boundaries result in a VCTR that is either one lower or one higher than the most accurate value of VCTR would be, it is expected that this type of over-skewing and under-skewing will occur with approximately equal frequency and thereby cancel each other out over an evaluation period of any reasonable duration.

A vulnerability evaluation period 403 for timeline 400 begins at the first transition of vulnerability clock signal 305, which occurs at the first low-to-high transition of system clock signal 301 following the assertion of vulnerability clock enable signal 303, i.e., at clock cycle transition 412-1. In at least one embodiment, VCTRs 331 and VACCs 341 are reset at the beginning of the evaluation window 403. During first clock cycle 411-1, which (as noted above) represents the portion of timeline 400 between clock cycle transitions 412-1 and 412-2, a modifying operation M1 (414-1) accesses the applicable cache element 321, i.e., the cache element 321 associated with the vulnerability logic 300 whose operation is illustrated, occurs shortly after clock cycle 412-1 begins.

Modifying access M1 (414-1) resets the value of VCTR to 0 (416-2) even though the VCTR was already 0 (416-1) from the reset occurring at the beginning of evaluation period 403. No further modifying or consuming accesses occur during first clock cycle 412-1 so that, at the clock cycle transition 412-2 at the end of clock cycle 412-1, VCTR is incremented to 1 (416-3).

During second clock cycle 411-2, a consuming access C1 (414-2) occurs near the beginning of clock cycle 412-2 and a modifying access M2 (414-3) occurs towards the end of the clock cycle. FIG. 4. illustrates that the "1" stored in VCTR accumulated to VACC at 418-1 when C1 (414-2) occurred and VCTR was then reset at 416-4.

The "1" that accumulated to VACC when C1 occurred represents that the data read, loaded, or otherwise consumed at 414-2 had been vulnerable approximately 1 clock cycle. In the illustrated example, where M1 (414-1) occurred towards the beginning of its clock cycle and C1 (414-2) occurred toward the beginning of its clock cycle, the approximation of 1 clock cycle of vulnerability is accurate within a rounding error, i.e., the actual time that the data was vulnerable is closer to 1 clock cycle than it is to 0 or 2 clock cycles. VCTR is then reset, albeit redundantly, at 416-5 following M2 (414-3).

In the third clock cycle 411-3, VCTR is incremented to 1 (416-6) at clock cycle transition 412-3. Since no events accessing the cache element occur during the clock cycle, VCTR and VACC remain unchanged during the cycle.

VCTR increments to a value of 2 (416-7) at clock cycle transition 412-4 at the end of clock cycle 412-3. When a consuming access C2 (414-4) occurs, the value of 2 stored in VCTR is accumulated to VACC at 418-2 before VCTR is reset (416-8). Since VACC previously stored a value of 1, the accumulation of the VCTR value of 2 results in a VACC value of 3. Later in clock cycle 411-4, consuming access C3 (414-5) causes vulnerability logic 300 to exercise the accumulation process described previously with respect to the consuming accesses C1 and C2. With respect to C3, however, since VCTR was reset (416-8) following C2 (414-4), the VCTR value is 0 when C3 occurs. Thus, the accumulation of VCTR to VACC at 414-5 causes no change in VACC and the value of VACC remains at 3 (418-3).

The value of 2 that VCTR contained when C2 414-4 occurred represented an approximation that the data stored in the cache element had been vulnerable for approximately 2 clock cycles when it was consumed at C2. This approximation, which is based on the number of clock cycle transitions 412 occurring between the modifying access and the consuming access, contains "rounding" error in this case because the modifying access M2 (414-3) occurred near the end of its clock cycle and the consuming access C2 (414-4) occurred near the start of its clock cycle, i.e., the actual duration of vulnerability is closer to 1 clock cycle than it is to 2 clock cycles and the vulnerability is overstated by the vulnerability logic. However, the vulnerability logic may also understate vulnerability, as illustrated with respect to modifying access M3 (414-6) and C4 (414-7) which occur in clock cycle 411-5. In this case, where the modifying access M3 occurs at the beginning of its cycle and the consuming access C4 occurs at the end of its cycle, the embodiment of vulnerability logic 300 illustrated by FIG. 4 accumulates the 0 stored in VCTR at 416-9 because no clock cycle transition 412 occurred between M3 and C4. The actual period of vulnerability, however, is closer to 1 and the vulnerability logic understates the vulnerability. Assuming that the prevalence of events resulting in overstated vulnerability and the prevalence of events resulting in understated vulnerability are approximately equal, the final accumulated value will approximate, without significantly overstating or understating, the actual vulnerability over an evaluation period of any appreciable number of cycles.

The estimation of vulnerability for a single instance of vulnerability logic 300 described above with respect to FIG. 4 may be duplicated in parallel for each instance of vulnerability logic 300. At the end of the evaluation period 403, signaled in FIG. 4 by the high-to-low transition 404 of vulnerability clock enable signal 303, each instance of vulnerability logic 300 will include a VACC 341 approximating the number of clock cycles that the corresponding cache element contained vulnerable data. In the FIG. 4 embodiment, the sum total of all VACCs 341 is computed and stored in GCTR 360 and may be accessed by evaluation module 370 to determine the AVF for the cache memory and take action to reduce vulnerability exposure if the AVF exceeds one or more thresholds or satisfies one or more criteria.

From the information in GCTR 360 and VCC 306, an estimation of the vulnerability for the cache memory as a whole may be estimated with knowledge of how many instances of vulnerability logic 300 participated in the evaluation and the granularity of the cache elements with which each instance of vulnerability logic 300 was associated. For example, in at least one embodiment, the AVF is estimated as a ratio of the total number of element-cycles during which data is vulnerable divided by the total number of element-cycles that elapsed during the evaluation window.

As indicated previously, vulnerability logic 300 may process certain cache operations differently depending upon the write policy of the cache. In at least one embodiment, vulnerability logic 300 implemented in a write-back cache behaves differently than vulnerability logic 300 for a write through cache with respect to an eviction of a cache element that includes modified data.

This is treated as a consuming operation in a write-back cache. The counter logic action applicable to this operation is set forth in Table 3.

TABLE 3

Counter logic action for different cache events for a write-back cache.

| CACHE EVENT | COUNTER LOGIC ACTION |
| --- | --- |
| Evict | 1) Determine cache element being evicted.<br>2) Determine whether the evicted cache element has dirty bits.<br>3) If the evicted cache element has dirty bits, access the cache element's counter, obtain the counter's value, and accumulate counter values to a global counter.<br>4) Reset the counter to zero (0). |

Figure 5:
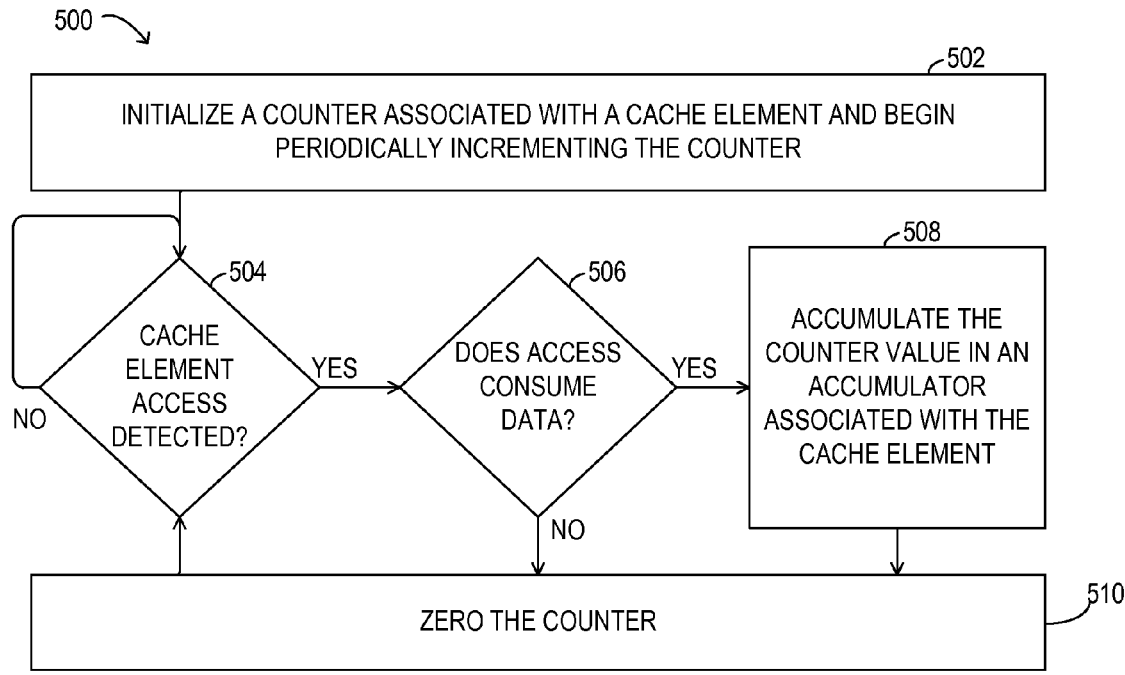
FIG. 5 illustrates one embodiment of a method to estimate vulnerability of an individual cache element.

Turning now to FIG. 5, a flow chart describing selected elements of an embodiment of method 500 for estimating vulnerability is illustrated. Operations in method 500 may be omitted or rearranged in different embodiments. Method 500 may be executed, at least in part, by processor 170 (see FIG. 1). In given embodiments, at least a portion of method 500 may be performed by vulnerability logic 300 in conjunction with a cache memory such as LLC 175. As shown, method 500 illustrates vulnerability estimation over an evaluation period for an individual instance of vulnerability logic 300 and its corresponding cache element 321. Method 600 (FIG. 6), described below, illustrates vulnerability estimation for a cache memory as a whole.

In the FIG. 5 embodiment, method 500 includes initializing a counter associated with a cache element and periodically incrementing (operation 502) the counter. The increments of the counter value may be based on a window clock that defines a counter logic period (an observation window) for the cache element. Method 500 may then make a determination whether a hit to the cache element has occurred (operation 504). When a result of operation 504 is NO, method 500 may loop back to operation 504. When a result of operation 504 is YES, method 500 may make a determination whether the hit is associated with an access that consumes data (operation 506). When a result of operation 506 is YES, method 500 may accumulate (operation 508) the counter value to a total counter. When a result of operation 506 is NO or after operation 508, method 500 may proceed by zeroing (operation 510) the counter value. After operation 510, method 500 may loop back to operation 504. It is noted that method 500 may continue for a duration of an evaluation period.

Figure 6:
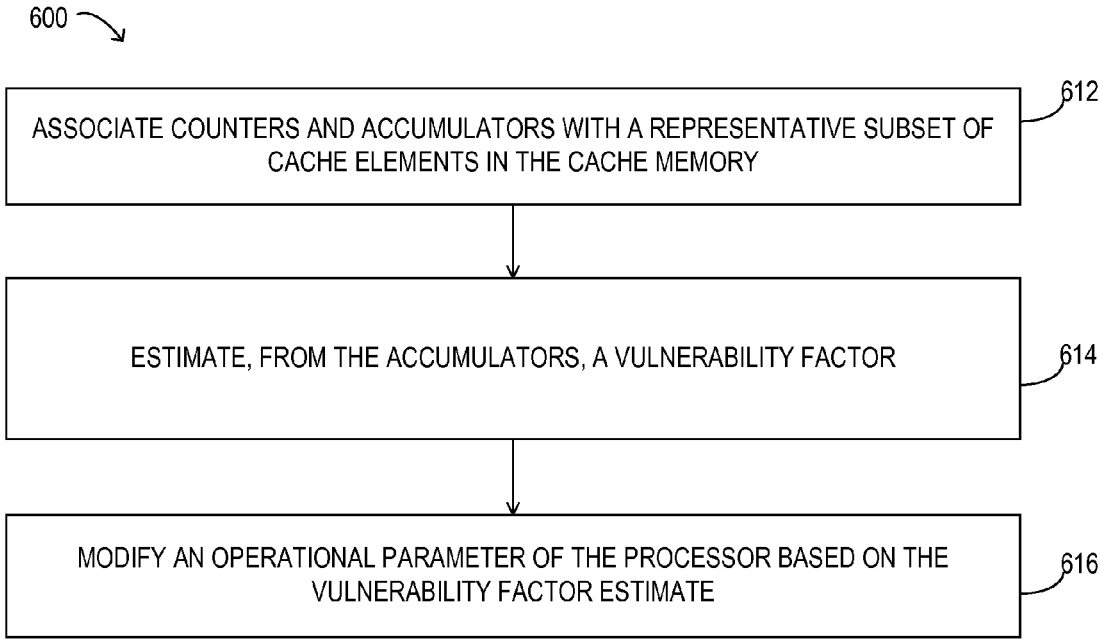
FIG. 6 illustrates one embodiment of a method to estimate vulnerability for an entire cache memory.

Referring to FIG. 6, method 600 may begin by selecting a subset of a plurality of cache elements to be representative of a cache memory of a processor. In the illustrated embodiment, method 600 includes associating (operation 612) counters and accumulators with a representative subset of cache elements in the cache memory. A vulnerability value indicative of a vulnerability of the cache memory is estimated (operation 614) from the value of the total counter accumulated from counter values for each of the cache elements in the subset. The counter value totals may be accumulated using method 600 for each individual cache element in parallel. An operational parameter of the processor may be modified (operation 616) based on the second vulnerability value. The operational parameter may include a parameter selected from: a voltage parameter, a current parameter, an impedance parameter, a power management parameter, an error detection parameter, an error correction parameter, and a component activation parameter. In various embodiments, a component that may be activated or deactivated by the component activation parameter may include a core, at least a portion of a cache line, and/or at least a portion of a cache memory, among other processor structures.

Figure 7:
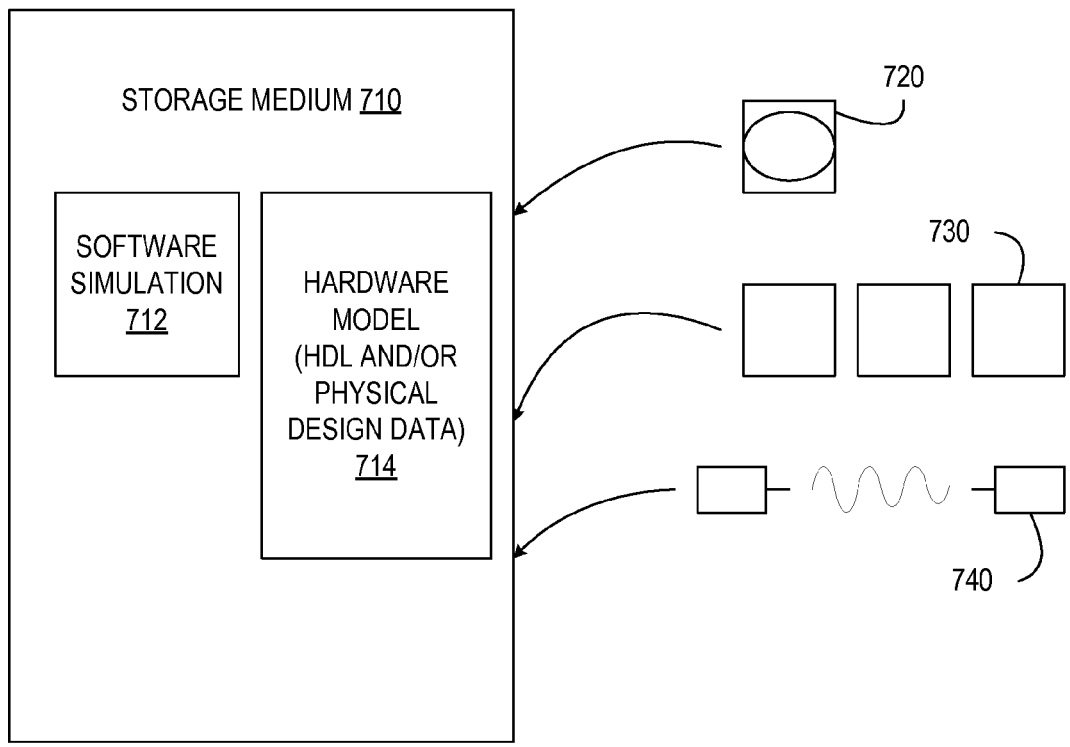
FIG. 7 is a block diagram of selected elements of a representation for simulation, emulation and fabrication of a design for a processor.

Referring now to FIG. 7, a representation for simulation, emulation and fabrication of a design implementing the disclosed techniques is illustrated. Data representing a design may represent the design in a number of manners. First, as is useful in simulations, the hardware may be represented using a hardware description language or another functional description language which basically provides a computerized model of how the designed hardware is expected to perform. The hardware model 714 may be stored in a storage medium 710 such as a computer memory so that the model may be simulated using simulation software 712 that applies a particular test suite to the hardware model 714 to determine if it indeed functions as intended. In some embodiments, the simulation software 712 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. An optical or electrical wave 740 modulated or otherwise generated to transmit such information, a memory 730, or a magnetic or optical storage 720 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

EXAMPLES

The following pertain to further embodiment.

Example 1 is a method of determining a soft error vulnerability comprising: (i) associating a first counter with a cache element and initializing the first counter; (ii) periodically incrementing the first counter; (iii) responding to a cache element access consuming data stored in the cache element by: accumulating a value of the first counter to a total counter and zeroing the first counter; (iv) responding to a cache element access modifying the data by zeroing the first counter; and (v) determining, from a value stored in the total counter at an end of an evaluation period, a vulnerability value indicative of a duration during which the data stored in the cache element of a cache memory was vulnerable.

In Example 2, the periodically incrementing of the first counter included in the subject matter of Example 1 can optionally include incrementing the value of the first counter based on clock cycles defined by a clock signal.

In Example 3, the subject matter of Example 2 can optionally include maintaining a total period value indicative of a number of the clock cycles elapsed while determining the vulnerability value.

In Example 4, the cache memory included in the subject matter of Example 1 can optionally include a plurality of cache lines and the cache element included in the subject matter of Example 1 can optionally include one of the plurality of cache lines.

In Example 5, the cache memory included in the subject matter of Example 1 can optionally include a plurality of cache lines and the cache element included in the subject matter of Example 1 can optionally include a portion of one of the plurality of cache lines.

In Example 6, the cache memory included in the subject matter of Example 1 can optionally include a plurality of cache elements and the subject matter of Example 1 can optionally include: (i) associating a plurality of first counters with a plurality of cache lines; (ii) associating a plurality of total counters with the plurality of cache lines; and (iii) determining a cumulative vulnerability value based on the plurality of total counter values at an end of an evaluation period.

In Example 7, the cache elements included in the subject matter of Example 6 can optionally include a subset of all cache elements in the cache memory and the subject matter of Example 6 can optionally include estimating a vulnerability associated with the cache memory based on the cumulative vulnerability value.

In Example 8, the estimating of the vulnerability associated with the cache memory included in the subject matter of Example 7 can optionally include: (i) determining a number of counter-cycles based on a number of clock cycles elapsing during the evaluation period; and (ii) dividing the cumulative vulnerability value by the number of counter-cycles.

In Example 9, the subject matter of Example 1 can optionally include modifying an operational parameter of a processor based on a vulnerability value determined.

In Example 10, the operational parameter included in the subject matter of Example 9 can optionally include a parameter selected from: a voltage parameter, a current parameter, an impedance parameter, a power management parameter, an error detection parameter, an error correction parameter, and a component activation parameter.

In Example 11, the cache element access consuming the data included in the subject matter of Example 1 can optionally be selected from: a read access of the cache element; and an eviction of the cache element, wherein the eviction of the cache element comprises a cache element access consuming the data when the cache memory is a write-back cache.

In Example 12, the cache element access modifying the data included in the subject matter of Example 11 can optionally be selected from: a write access to the cache element; and a fill of the cache element.

Example 13 is a processor comprising: (i) a processing core; (ii) a cache memory accessible to the processing core; and (iii) vulnerability logic to determine a vulnerability value indicative of time during which data stored in a first cache element of the cache memory was vulnerable to data loss.

In Example 14, the cache memory included in the subject matter of Example 13 can optionally include a plurality of cache lines and wherein the first cache element comprises a portion of a first cache line.

In Example 15, the vulnerability logic included in the subject matter of Example 13 can optionally include first counter logic to control a first counter value based in part on accesses to the first cache element.

In Example 16, the first counter logic included in the subject matter of Example 15 can optionally be operable to: (i) initialize the first counter value to zero at a beginning of an evaluation period; (ii) increment the first counter value periodically; and (iii) reset the first counter value in response to an access to the first cache element.

In Example 17, the first counter logic included in the subject matter of Example 16 can optionally be operable to: (i) maintain a total period value indicative of a number of counter logic periods elapsed during the evaluation period; and (ii) accumulate the first counter value to a counter value total, wherein the first counter value is added to the counter value total each time the access to the first cache element is a read operation that hits the first cache element during the evaluation period.

In Example 18, the cache memory included in the subject matter of Example 17 can optionally include a plurality of cache elements and wherein the vulnerability logic is operable to determine a second vulnerability value indicative of time between accesses of data stored in the plurality of cache elements.

In Example 19, the vulnerability logic included in the subject matter of Example 18 can optionally be operable to: (i) determine the second vulnerability value for a subset of the plurality of cache elements; and (ii) use the second vulnerability value to estimate a vulnerability of the cache memory.

Example 20 is a computer system comprising: (i) first storage to store an operating system and (ii) a processor including a cache memory and vulnerability logic associated with a cache element; wherein the vulnerability logic is operable to: estimate, for each access that consumes data stored in the cache element during an evaluation period, a number of clock cycles since an access modifying the data occurred; accumulate the estimates to a total counter; count a number of clock cycles elapsed during the evaluation period; and determine a vulnerability factor based on the estimate and the number of clock cycles counted.

In Example 21, the additional instances of vulnerability logic included in the subject matter of Example 20 can optionally be associated with additional cache elements and wherein accumulating the estimates includes accumulating the additional estimates to respective total counters.

In Example 22, the subject matter of Example 20 can optionally include a touch screen interface in communication with the processor.

In Example 23, the cache memory included in the subject matter of any of Examples 1, 2, or 3 can optionally include a plurality of cache lines and the cache element included in the subject matter of any of Examples 1, 2, or 3 can optionally include one of the plurality of cache lines.

In Example 24, the subject matter of any of Examples 1, 2, or 3 can optionally include modifying an operational parameter of a processor based on a vulnerability value determined.

In Example 25, the vulnerability logic included in any of the subject matter of Examples 13 or 14 can optionally include first counter logic to control a first counter value based in part on accesses to the first cache element.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method of determining a soft error vulnerability, the method comprising:
    associating a first counter with a cache element and initializing the first counter;
    periodically incrementing the first counter;
    responding to a cache element access consuming data stored in the cache element by:
        accumulating a value of the first counter to a total counter; and
        zeroing the first counter;
    responding to a cache element access modifying the data by:
        zeroing the first counter; and
    determining, from a value stored in the total counter at an end of an evaluation period, a vulnerability value indicative of a duration during which the data stored in the cache element of a cache memory was vulnerable.

2. The method of claim 1, wherein periodically incrementing the first counter includes incrementing the value of the first counter based on clock cycles defined by a clock signal.

3. The method of claim 2, further comprising:
    maintaining a total period value indicative of a number of the clock cycles elapsed while determining the vulnerability value.

4. The method of claim 1, wherein:
    the cache memory includes a plurality of cache lines; and
    the cache element comprises one of the plurality of cache lines.

5. The method of claim 1, wherein:
    the cache memory includes a plurality of cache lines; and
    the cache element comprises a portion of one of the plurality of cache lines.

6. The method of claim 1, wherein the cache memory includes a plurality of cache elements, wherein the method includes:
    associating a plurality of first counters with a plurality of cache lines;
    associating a plurality of total counters with the plurality of cache lines; and
    determining a cumulative vulnerability value based on the plurality of total counter values at an end of an evaluation period.

7. The method of claim 6, wherein the plurality of cache elements comprise a subset of all cache elements in the cache memory, wherein the method includes:
    estimating a vulnerability associated with the cache memory based on the cumulative vulnerability value.

8. The method of claim 7, wherein estimating the vulnerability associated with the cache memory includes:
    determining a number of counter-cycles based on a number of clock cycles elapsing during the evaluation period; and
    dividing the cumulative vulnerability value by the number of counter-cycles.

9. The method of claim 1, further comprising:
    modifying an operational parameter of a processor based on a vulnerability value determined.

10. The method of claim 9, wherein the operational parameter includes a parameter selected from: a voltage parameter, a current parameter, an impedance parameter, a power management parameter, an error detection parameter, an error correction parameter, and a component activation parameter.

11. The method of claim 1, wherein the cache element access consuming the data is selected from:
- a read access of the cache element; and
- an eviction of the cache element, wherein the eviction of the cache element comprises a cache element access consuming the data when the cache memory is a write-back cache.

12. The method of claim 11, wherein the cache element access modifying the data is selected from:
- a write access to the cache element; and
- a fill of the cache element.

13. A processor, comprising:
- a processing core;
- a cache memory accessible to the processing core; and
- vulnerability logic to determine a vulnerability value indicative of time during which data stored in a first cache element of the cache memory was vulnerable to data loss.

14. The processor of claim 13, wherein the cache memory includes a plurality of cache lines and wherein the first cache element comprises a portion of a first cache line.

15. The processor of claim 13, wherein the vulnerability logic includes first counter logic to control a first counter value based in part on accesses to the first cache element.

16. The processor of claim 15, wherein the first counter logic is operable to:
- initialize the first counter value to zero at a beginning of an evaluation period;
- increment the first counter value periodically; and
- reset the first counter value in response to an access to the first cache element.

17. The processor of claim 16, wherein the first counter logic is operable to:
- maintain a total period value indicative of a number of counter logic periods elapsed during the evaluation period; and
- accumulate the first counter value to a counter value total, wherein the first counter value is added to the counter value total each time the access to the first cache element is a read operation that hits the first cache element during the evaluation period.

18. The processor of claim 17, wherein the cache memory includes a plurality of cache elements and wherein the vulnerability logic is operable to determine a second vulnerability value indicative of time between accesses of data stored in the plurality of cache elements.

19. The processor of claim 18, wherein the vulnerability logic is operable to:
- determine the second vulnerability value for a subset of the plurality of cache elements; and
- use the second vulnerability value to estimate a vulnerability of the cache memory.

20. A computer system, comprising:
- first storage to store an operating system; and
- a processor including a cache memory and vulnerability logic associated with a cache element;
- wherein the vulnerability logic is operable to:
  - estimate, for each access that consumes data stored in the cache element during an evaluation period, a number of clock cycles since an access modifying the data occurred;
  - accumulate the estimates to a total counter;
  - count a number of clock cycles elapsed during the evaluation period; and
  - determine a vulnerability factor based on the estimate and the number of clock cycles counted.

21. The computer system of claim 20, wherein additional instances of vulnerability logic are associated with additional cache elements and wherein accumulating the estimates includes accumulating the additional estimates to respective total counters.

22. The computer system of claim 20, further comprising a touch screen interface in communication with the processor.

* * * * *